July 8, 1952     T. R. KORKATTI     2,602,193
CELLULAR RESINOUS MATERIALS AND PROCESSES OF MAKING THE SAME
Filed Jan. 8, 1949
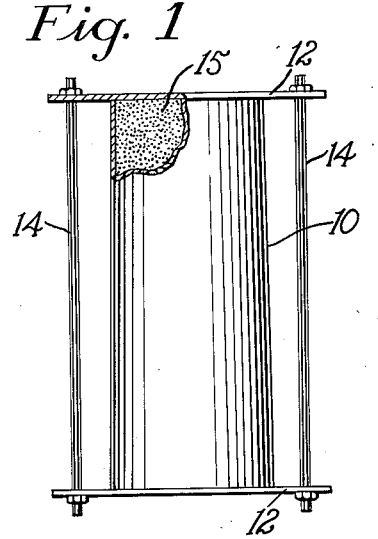
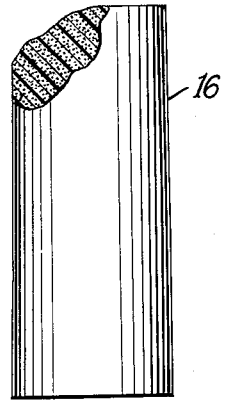
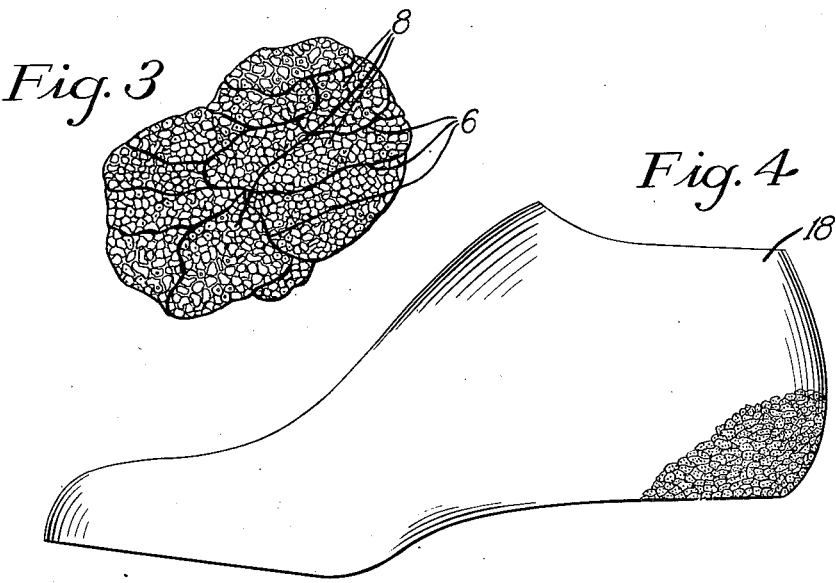
Inventor
Theodore R. Korkatti
By his Attorney Patented July 8, 1952

2,602,193

UNITED STATES PATENT OFFICE 2,602,193

CELLULAR RESINOUS MATERIALS AND PROCESSES OF MAKING THE SAME

Theodore R. Korkatti, Gloucester, Mass., assignor to United Shoe Machinery Corporation, Flemington, N. J., a corporation of New Jersey Application January 8, 1949, Serial No. 69,965

9 Claims. (Cl. 18—55)

This invention relates to an improved porous resinous material particularly suitable for use in the manufacture of shoe lasts and to a process for molding articles such as lasts.

In the copending application of McMillan and Olson, Serial No. 61,154, filed November 20, 1948, there is disclosed a new type of strong, light, porous, resinous material which is formed by heating a mass of granules of resinous material containing a blowing agent. The heat softens the resinous granules and causes evolution of gas from the blowing agent so that the granules expand to fill the intergranular spaces and fuse together to form a continuous cellular structure of substantially nonporous material the cells of which are filled with porous resinous material.

It is a feature of the present invention to provide an improved material similar in structure to that disclosed in said copending application but having additional strength and resistance to shock through a new combination of materials.

These and other features are described below and are illustrated in the accompanying drawings, in which:

Fig. 1 is a sectional elevation of a mold filled with the new molding material according to the present invention;

Fig. 2 is a sectional elevation showing the hard, strong, porous molded material;

Fig. 3 is a drawing from a photomicrograph of a cut and polished section of the cellular material of the present invention; and Fig. 4 is a perspective view of a last turned from the molded material.

In accordance with the present invention there are combined a butadiene acrylonitrile copolymer containing at least 20% of acrylonitrile, a heat-hardening phenolic resin capable of reacting with the copolymer to form a cured reaction product, and an elastomeric compound which is not reactive with phenolic resin. These materials are intimately mixed, for example in a mill, and a blowing agent is incorporated in the mixture. The mixture is sheeted out, cooled and subdivided into granules. These granules are then disposed in a mold, for example a simple tubular mold as shown in Fig. 1, and are heated to cause softening of the resin and evolution of gas from the blowing agent. Heating is continued to cause reaction between the butadiene acrylonitrile copolymer and the phenolic resin.

The evolved gas expands the individual solid granules to fill the intergranular spaces and to force the faces of the expanded granules into continuous contact with the surfaces of adjacent granules and with the surfaces of the mold. The molded article is then removed from the mold.

The intimate mixture of phenolic resin, a butadiene acrylonitrile copolymer and nonreactive elastomeric compound softens, at a temperature below that at which the blowing agent develops substantial blowing pressure, to a readily deformable and tacky condition so that the granules are readily expanded under the action of the blowing agent to fill the intergranular spaces and bond with adjacent expanded granules. During the continued heating the phenolic resin reacts with the butadiene acrylonitrile copolymer to form a material which is strong and firm when cooled. The elastomeric compound does not react with the phenolic resin and its exact physical state or condition in the cured material has not been fully established. The elastomeric material may be present in the form of a solid solution in the resinous material, or may be present as dispersed bodies such as fibers or sheets or may be present in some other form. Whatever be the form in which it is present, it exerts a remarkable toughening effect so that the material is substantially more resistant to shock or suddenly applied stresses or blows than is a similarly prepared material comprising phenolic resin and butadiene acrylonitrile copolymer without the elastomeric compound.

As illustrated in Fig. 3, the product obtained possesses a special structure resulting from the expansion and fusing together of the resinous granules. This structure comprises a continuous cellular framework (shown as thick lines 6) of substantially non-porous resinous material defining enclosed spaces or cells 8 which are filled with an expanded resinous material. This nonporous cellular structure or framework apparently contributes to the mechanical strength of the product. Also the area of fused together surface formed by the fusing together during expansion of the resinous granules, is large and unites the mass which had consisted of separate granules into a strong integral body which shows no tendency to separate along lines corresponding to junctures between granules in the initial composition. This novel structure wherein the resinous material possesses the resistance to shock obtained through the combination of phenolic resin, butadiene acrylonitrile copolymer and elastomeric compound possesses to a remarkable degree the characteristics desired for lasts for shoemaking.

Suitable phenolic resins for use in the composition of the present invention include the commercially available resins known as Durez Resin 12687 obtained from the Durez Plastic & Chemicals Company, of North Tonawanda, New York, which is understood to be a condensation of cashew nutshell oil and another phenol reacted with an aldehyde. It is understood that this is of the type of resin described in United States Letters Patent No. 2,203,206, granted June 4, 1940, upon application of Alvin F. Shepard et al. Other resins which have been found suitable are Monsanto phenol-aldehyde resins 378 and L-9718, and a phenolic resin identified as #12315 obtained from the General Electric Company. These latter are understood to be straight phenolic resins especially adapted for reaction with butadiene acrylonitrile copolymer rubber.

Butadiene acrylonitrile copolymer synthetic rubbers which may be employed in the composition of the present invention are the materials known as Hycar OR25 and Hycar OR15 which are understood to contain, respectively, 33% and 45% acrylonitrile and which are obtained from the B. F. Goodrich Company, of Akron, Ohio. Other copolymer rubber such as Chemigum N3 and N4, which are obtained from the Goodyear Tire and Rubber Company, of Akron, Ohio, Butaprenes obtained from Firestone Tire and Rubber Company, of Akron, Ohio, and Perbunans obtained from Enjay Company, of New York, New York, may be used provided they contain at least 20% acrylonitrile. To obtain the desired plasticizing action of the copolymer on the resinous material there will be employed from 30 to 100 parts of the butadiene-acrylonitrile copolymer to 100 parts of the phenol-aldehyde resinous material.

The component which combines with the above materials to improve resistance to shock particularly fitting the material for the special use as a last material is an elastomeric compound which is not reactive with the phenolic resin. Natural rubber is particularly satisfactory for this use, but there may be used other elastomeric compounds such as polyisoprene, copolymers of butadiene and styrene containing 30 to 70% styrene, and polyisobutylene. These materials may be employed in the ratio of from 20 to 75 parts, preferably from 45 to 55 parts by weight of the butadiene acrylonitrile copolymer.

Compatible low-melting plasticizers, such as a coumarone-indene plasticizer or a conventional plasticizer for phenolic resins, may be added for the usual purposes.

With the resinous material there may be incorporated sufficient blowing agent to maintain the volume of the material and to insure satisfactory molding pressure. A preferred range is from 3 to 15 parts by weight of a blowing agent to 100 parts by weight of the resinous material. Any conventional blowing agent may be used but it has been found that the blowing agents, sodium bicarbonate plus stearic acid, and a blowing agent understood to be biuret and urea obtained from the Sherwin Williams Company, are particularly satisfactory.

It has been observed that in compositions including a curing agent such as hexamethylenetetramine, which evolves gas during the curing cycle, the conventional blowing agent may be employed in reduced proportion or even eliminated. It is to be understood that in the specification and claims reference to a blowing agent includes such gas generating agents, even though they serve to give an additional effect.

The blowing agents may be compounded with the resinous material on a mill or in a Banbury mixer or in any other mixing equipment. The temperature of mixing must be kept below that value at which the blowing agent generates gas, and with the above agents it has been found that satisfactory mixing can be obtained at temperatures of from 140° to 200° F. The mixture is sheeted out and permitted to cool to a friable mass and is then broken up into granules of a desired size. For use in a last, granules of from $\frac{1}{16}$ of an inch to about ¼ of an inch have been found very satisfactory. For other uses the material may be reduced to a powder or may be used in even larger particle sizes.

The composition comprising the resinous material and the blowing agent is satisfactory for use in forming tough, strong articles; but for various purposes, including improving the cold flow characteristics and reducing the cost of the material, there may be employed a filler such as clay, channel black, calcium carbonate or other known mineral filler. A quantity of filler up to a weight approximating or even slightly exceeding the total weight of the resinous material and plasticizer may be employed. The filler will be incorporated in the resinous material by the same procedure and at the same time as, or before, incorporation of the blowing agent.

A mold (see Fig. 1) which may be used in forming an article using the material of the present invention may comprise an open ended mold 10 of circular cross section tapering slightly toward one end for ease of removal of the molded material, and end plates 12 secured over the open ends of the mold by tie bolts 14.

The granules 15 containing a blowing agent are placed in the mold 10 in quantity to substantially fill the mold, the end plates 12 are secured in position by the tie bolts 14, and the assembly is subjected to heat sufficient to soften the particles and to cause them to expand under the action of the blowing agent. A heat treatment of approximately three hours at 135° C. has been found satisfactory to cause expansion and sintering of the granules and curing of the material comprising the defined phenolic resin, a butadiene acrylonitrile copolymer synthetic rubber and the non-reactive elastomeric compound.

The molded block 16 (see Fig. 2) is removed from the mold and may be turned or otherwise shaped for the manufacture of articles such as a last 18 (see Fig. 4).

The following examples are given to assist in understanding the invention. It is to be understood that the invention is not limited to the materials, proportions, or operational details disclosed in the examples.

Example I

| | Parts by weight |
|---|---|
| Butadiene acrylonitrile copolymer (Hycar OR-15) | 100 |
| Cashew nutshell oil phenol aldehyde resin (Durez 12687) | 150 |
| Pale crepe rubber | 50 |
| Sulfur | 10 |
| ZnO | 5 |
| Benzothiazyl disulfide | 3 |
| Stearic acid | 2.5 |
| Mineral filler (Dixie Clay) | 30 |
| Diazo amino benzene | 5 |

The above materials were mixed on a Banbury mixer at a temperature which varied from 140° to 200° F. The mixture was sheeted out and permitted to cool to a friable condition. The cooled material was then broken up to a particle size comprising granules ranging from $\frac{1}{16}$ to ¼ inch. These granules were then poured into a heated mold at a temperature of 100° C. in quantity sufficient to completely fill the mold. The temperature of the mold was brought to 120° C. and maintained at that temperature for three hours. The mold and its contents were cooled and the mold removed from the molded article. A last (see Fig. 4) was turned from the molded block of material and was found highly satisfactory for the lasting of shoes.

Example II

| | Parts by weight |
|---|---|
| Cashew nutshell oil-phenol aldehyde resin (Durez 12867) | 300 |
| Butadiene acrylonitrile copolymer rubber (Hycar OR25) | 200 |
| Pale crepe rubber | 100 |
| Mineral filler (Dixie Clay) | 60 |
| Diazo amino benzene | 7 |

The above materials were mixed, sheeted out and granulated as in Example I. The granules were poured into a hot mold at a temperature of 135° C. and were cured for three hours at 135° C. The mold was then cooled and the molded material removed from the mold. A last turned from the molded block was found to be exceptionally strong and resistant to fracture under the most severe conditions encountered in its use in making shoes.

Example III

| | Parts by weight |
|---|---|
| Cashew nutshell oil-phenol aldehyde resin (Durez 12867) | 300 |
| Butadiene acrylonitrile copolymer rubber (Hycar OR25) | 200 |
| Polyisobutylene (Vistanex B120) | 100 |
| Mineral filler (Dixie Clay) | 60 |
| Diazo amino benzene | 7 |

The above materials were mixed, sheeted out and granulated as in Example I. The granules were poured into a hot mold at a temperature of 135° C. and were cured for three hours at this temperature. The molded material was then removed from the mold. A last turned from the molded block was found quite satisfactory for use in making shoes.

Having described my invention, what I claim as new and desire to secure by Letters Patent of the United States is:

1. Material possessing strength and resistance to shock comprising a network of relatively thick membranes of substantially nonporous resinous material defining cells and thinner membranes of the same resinous material subdividing said cells, said resinous material comprising the reaction product of a thermosetting resinous condensation product of an aldehyde and a phenol with butadiene acrylonitrile copolymer rubber containing at least 20% of acrylonitrile and an elastomeric compound which is not reactive with the phenolic resin, said copolymer and the phenol aldehyde resin being present in the ratio of 100 to 300 parts of the phenol aldehyde resin to 100 parts of the copolymer, the elastomeric compound being present in the ratio of from 20 to 75 parts to 100 parts of the copolymer.

2. A last possessing the strength and resistance to shock necessary for use in the making of shoes comprising a shaped body of material composed of a network of relatively thick membranes of substantially nonporous resinous material defining cells and thinner membranes of the same resinous material subdividing said cells, said resinous material comprising the reaction product of a thermosetting resinous condensation product of an aldehyde and a phenol with butadiene acrylonitrile copolymer rubber containing at least 20% of acrylonitrile and an elastomeric compound which is not reactive with the phenolic resin, said copolymer and the phenol aldehyde resin being present in the ratio of 100 to 300 parts of the phenol aldehyde resin to 100 parts of the copolymer, the elastomeric compound being present in the ratio of from 20 to 75 parts to 100 parts of the copolymer.

3. A material possessing the strength and resistance to shock necessary for use as a last material comprising a network of relatively thick membranes of substantially nonporous resinous material defining cells and thinner membranes of the same resinous material subdividing said cells, said resinous material comprising the reaction product of a thermosetting resinous condensation product of an aldehyde and a phenol with butadiene acrylonitrile copolymer rubber containing at least 20% of acrylonitrile, and natural rubber, said copolymer and the phenol aldehyde resin being present in the ratio of 100 to 300 parts of the phenol aldehyde resin to 100 parts of the copolymer, the natural rubber being present in the ratio of from 45 to 55 parts to 100 parts of the copolymer.

4. A material possessing the strength and resistance to shock necessary for use as a last material comprising a network of relatively thick membranes of substantially nonporous resinous material defining cells and thinner membranes of the same resinous material subdividing said cells, said resinous material comprising the reaction product of a thermosetting resinous condensation product of an aldehyde and a phenol with butadiene acrylonitrile copolymer rubber containing at least 20% of acrylonitrile and polyisobutylene, said copolymer and the phenol aldehyde resin being present in the ratio of 100 to 300 parts of the phenol aldehyde resin to 100 parts of the copolymer, the polyisobutylene being present in the ratio of from 45 to 55 parts to 100 parts of the copolymer.

5. A material possessing the strength and resistance to shock necessary for use as a last material comprising a network of relatively thick membranes of substantially nonporous resinous material defining cells and thinner membranes of the same resinous material subdividing said cells, said resinous material comprising the reaction product of a thermosetting resinous condensation product of an aldehyde and a phenol with butadiene acrylonitrile copolymer rubber containing at least 20% of acrylonitrile and a butadiene styrene copolymer containing from 30 to 70% styrene, said butadiene acrylonitrile copolymer and the phenol aldehyde resin being present in the ratio of 100 to 300 parts of the phenol aldehyde resin to 100 parts of the butadiene acrylonitrile copolymer, the butadiene styrene copolymer being present in the ratio of from 45 to 55 parts to 100 parts of the butadiene-acrylonitrile copolymer.

6. The process of molding which comprises the steps of substantially filling a mold with dense granules of a resinous material comprising a thermosetting resinous condensation product of an aldehyde and a phenol, a butadiene acrylonitrile copolymer rubber, an elastomeric compound which is not reactive with the phenol aldehyde resin, and a blowing agent within the granules of resinous material, heating the granules to soften the resinous material and to cause the blowing agent to expand the granules to establish molding pressure and to force the surfaces of the expanded granules into contact with the surfaces of adjacent granules and to sinter together the contacting surface portions of the granules into a continuous network of relatively thick membranes of resinous material defining cells, the expanded resinous material of the interior of the granules forming thinner membranes subdividing said cells, and continuing the heating to complete the reaction between the phenol aldehyde resin and the copolymer.

7. The process of molding which comprises the steps of incorporating a blowing agent in a heat-softening resinous material comprising 100 parts of a butadiene acrylonitrile copolymer rubber containing at least 20% of acrylonitrile, 100 to 300 parts of a thermosetting resinous condensation product of an aldehyde and a phenol, and from 20 to 75 parts of natural rubber, dividing the resinous material into dense granules from $\frac{1}{16}$ inch to $\frac{1}{4}$ inch in size, placing in a mold a quantity of granules sufficient to give the desired density to the final molded product, heating the material to a temperature sufficient to soften the resinous material and to cause the blowing agent to expand the granules to establish molding pressure and to force the surfaces of the expanded granules into contact with the surfaces of adjacent granules and to sinter together the contacting surface portions of the granules into a continuous network of relatively thick membranes of resinous material defining cells, the expanded resinous material of the interior of the granules forming thinner membranes subdividing said cells, and continuing heating to effect a curing reaction between the butadiene acrylonitrile copolymer rubber and the condensation product.

8. The process of molding which comprises the steps of incorporating a blowing agent in a heat-softening resinous material comprising 100 parts of a butadiene acrylonitrile copolymer rubber containing at least 20% of acrylonitrile, 100 to 300 parts of a thermosetting resinous condensation product of an aldehyde and a phenol, and from 20 to 75 parts of butadiene styrene copolymer containing from 30% to 70% of styrene, dividing the resinous material into dense granules from $\frac{1}{16}$ inch to $\frac{1}{4}$ inch in size, placing in a mold a quantity of granules sufficient to give the desired density to the final molded product, heating the material to a temperature sufficient to soften the resinous material and to cause the blowing agent to expand the granules to establish molding pressure and to force the surfaces of the expanded granules into contact with the surfaces of adjacent granules and to sinter together the contacting surface portions of the granules into a continuous network of relatively thick membranes of resinous material defining cells, the expanded resinous material of the interior of the granules forming thinner membranes subdividing said cells, and continuing heating to effect a curing reaction between the butadiene acrylonitrile copolymer rubber and the condensation product.

9. The process of molding which comprises the steps of incorporating a blowing agent in a heat-softening resinous material comprising 100 parts of a butadiene acrylonitrile copolymer rubber containing at least 20% of acrylonitrile, 100 to 300 parts of a thermosetting resinous condensation product of an aldehyde and a phenol, and from 20 to 75 parts of polyisobutylene, dividing the resinous material into dense granules from $\frac{1}{16}$ inch to $\frac{1}{4}$ inch in size, placing in a mold a quantity of granules sufficient to give the desired density to the final molded product, and heating the material to a temperature sufficient to soften the resinous material and to cause the blowing agent to expand the granules to establish molding pressure and to force the surfaces of the expanded granules into contact with the surfaces of adjacent granules and to sinter together the contacting surface portions of the granules into a continuous network of relatively thick membranes of resinous material defining cells, the expanded resinous material of the interior of the granules forming thinner membranes subdividing said cells, and continuing heating to effect a curing reaction between the butadiene acrylonitrile copolymer rubber and the condensation product.

THEODORE R. KORKATTI.

REFERENCES CITED

The following references are of record in the file of this patent:

UNITED STATES PATENTS

| Number | Name | Date |
|---|---|---|
| 2,136,096 | Benner et al. | Nov. 8, 1938 |
| 2,363,051 | Dosmann | Nov. 21, 1944 |
| 2,373,613 | Szegvari et al. | Apr. 10, 1945 |
| 2,459,739 | Groten et al. | Jan. 18, 1949 |